United States Patent [19]

Novotny

[11] Patent Number: 4,878,617
[45] Date of Patent: Nov. 7, 1989

[54] TRIPLE AXIS THRUST VECTORING EXHAUST NOZZLE

[75] Inventor: Rudolph J. Novotny, Stuart, Fla.

[73] Assignee: United Technologies Corporation, Hartford, Conn.

[21] Appl. No.: 198,023

[22] Filed: May 24, 1988

[51] Int. Cl.⁴ .............................................. F02K 1/12
[52] U.S. Cl. ................................ 239/265.35; 60/228; 239/265.41; 239/265.43; 244/52
[58] Field of Search .................... 239/265.19, 265.25, 239/265.33, 265.35, 265.37, 265.39, 265.41, 265.43; 244/52; 60/228, 230, 232

[56] References Cited

U.S. PATENT DOCUMENTS

| | | | |
|---|---|---|---|
| 2,593,420 | 4/1952 | Diehl | 239/265.43 |
| 3,007,304 | 11/1961 | Wotton et al. | 60/35.6 |
| 3,133,412 | 5/1964 | Westley | 239/265.39 |
| 3,174,582 | 3/1965 | Duthion et al. | 239/265.39 |
| 3,615,052 | 10/1971 | Tumavicus | 239/265.43 |
| 3,976,160 | 8/1976 | Hoch et al. | 181/33 HD |
| 4,707,899 | 11/1987 | Singer | 29/157 C |

Primary Examiner—Andres Kashnikow
Assistant Examiner—Michael J. Forman
Attorney, Agent, or Firm—Troxell K. Snyder

[57] ABSTRACT

A variable area, convergent-divergent (10) nozzle for directing the flow of exhaust gas from an aircraft turbine engine to achieve thrust vectoring about yaw, pitch and roll axes includes a convergent section (16) and a divergent section (18) each comprised of hingedly connected planar members (201–214, 301–322) selectively positioned by actuators (101–114) for defining deformable gas directing flow ducts.

8 Claims, 8 Drawing Sheets

CONVERGENT SECTION  DIVERGENT SECTION

TRIPLE AXIS THRUST VECTORING EXHAUST NOZZLE

FIELD OF THE INVENTION

The present invention relates to a thrust vectoring exhaust nozzle for an aircraft gas turbine engine.

BACKGROUND

The control and maneuvering of modern high speed aircraft remains a technical area in which designers continue to press for ever-increasing effectiveness. Such increased control response may require a balancing with increased airframe drag as control surfaces become larger, while in certain flight regimes, such as in supersonic or low-speed flight, the effectiveness of even large surfaces is diminished for certain angles of attack, etc.

One effective method for imparting additional maneuvering force is the use of a thrust vectoring exhaust nozzle. Such nozzles divert the flow of exhaust gas from the aircraft propelling gas turbine engine at an angle from the normal exhaust flow, thereby developing asymmetric thrust (and hence moment) with respect to the airframe center of gravity. Simpler versions of such thrust vectoring nozzles are able to impart thrust vectoring with respect to a single axis, for example the pitch axis. Such simpler versions still require several cooperating gas directing surfaces, especially convergent-divergent thrust vectoring nozzles used in conjunction with gas turbine engines equipped with an afterburner. The convergent section of such nozzles must be adapted to provide a variable throat area for optimization of the engine thrust, while the divergent section directs the exhaust gas selectably in the vertical plane for pitch thrust vectoring.

Yaw and pitch thrust vectoring exhaust nozzles are also known in the art, and are able to divert the exhaust gases in both the horizontal and vertical plane, thus achieving two axis thrust vectoring. Such two axis nozzles require additional structure and complexity over the one axis designs, requiring the advantages of increased maneuverability to be balanced against the additional weight and complexity required.

One advantage which thrust vectoring designs achieve with respect to prior art unvectored engine exhaust systems is the reduced control surface requirement for normal and even emergency maneuvering. The use of thrust vectoring exhaust nozzles in conjunction with automatic attitude control systems can achieve stable aircraft operation and control with reduced external control surfaces. Hence, an airframe having even a pitch thrust vectoring exhaust nozzle may operate with reduced size elevators providing benefits in external drag reduction, weight, etc. Likewise, a nozzle having yaw thrust vectoring capability can provide the necessary yaw maneuvering and stability to the airframe while permitting a reduction in rudder size.

A third axis of control remains which has no been adequately addressed by the prior art nozzle designs. The roll axis, traditionally controlled by ailerons on the aircraft wings, has thus far not been practically addressed by prior art thrust vectoring nozzles. What is needed is a thrust vectoring exhaust nozzle able to provide complete three axis thrust vectoring to an airframe, thereby achieving satisfactory control and stability with a reduced requirement for external control surface action.

SUMMARY OF THE INVENTION

It is therefore an object of the present invention to provide a thrust vectoring exhaust nozzle for an aircraft gas turbine engine.

It is further an object of the present invention to provide a thrust vectoring nozzle capable of selectably providing yaw, pitch, and roll thrust vectoring.

It is further an object of the present invention to provide a variable flow area, convergent exhaust duct upstream of the thrust vectoring outlet, for optimizing nozzle performance under a range of engine power levels.

According to the present invention, a plurality of hinged triangular segments define a deformable divergent duct for receiving a flow of exhaust gas from a gas turbine engine and discharging such exhaust gas from the downstream end thereof. The hinged segments are generally planar and elongated with respect to the exhaust gas flow direction. Adjacent segments are hingedly joined longitudinally, forming a gas tight circumferential barrier for directing the exhaust flow.

The present invention further provides a plurality of actuators, each disposed between a fixed frame and the plurality of segments, for selectably positioning the segments and thereby influencing the discharge direction of the exhaust flow from the divergent duct. By properly positioning the individual segments, the exhaust flow can be configured to impart a resultant thrust on the nozzle structure and airframe which is asymmetric with respect to an unvectored, central axis. The deformable divergent duct according to the present invention is thus able not only to develop lateral and vertical thrust in the yaw and pitch directions, but can also achieve a torsional moment about the aircraft central axis, thereby achieving roll thrust vectoring as desired.

The nozzle according to the present invention further provides an upstream, convergent duct defined by a plurality of triangular and rectangular flaps hingedly joined together. The convergent flaps are positioned to define a converging gas flow passage having a variable throat area for discharging the exhaust gases into the downstream divergent duct.

The advantages of the variable area, triple axis thrust vectoring nozzle according to the present invention include enhanced aircraft maneuverability and stability as well as lower aerodynamic drag resulting from a reduced demand for external maneuvering control surfaces. Both these and other objects and advantages of the present invention will be apparent to those skilled in the art upon review of the following specification and the appended claims and drawing figures.

DETAILED DESCRIPTION OF THE INVENTION

Figure 1:
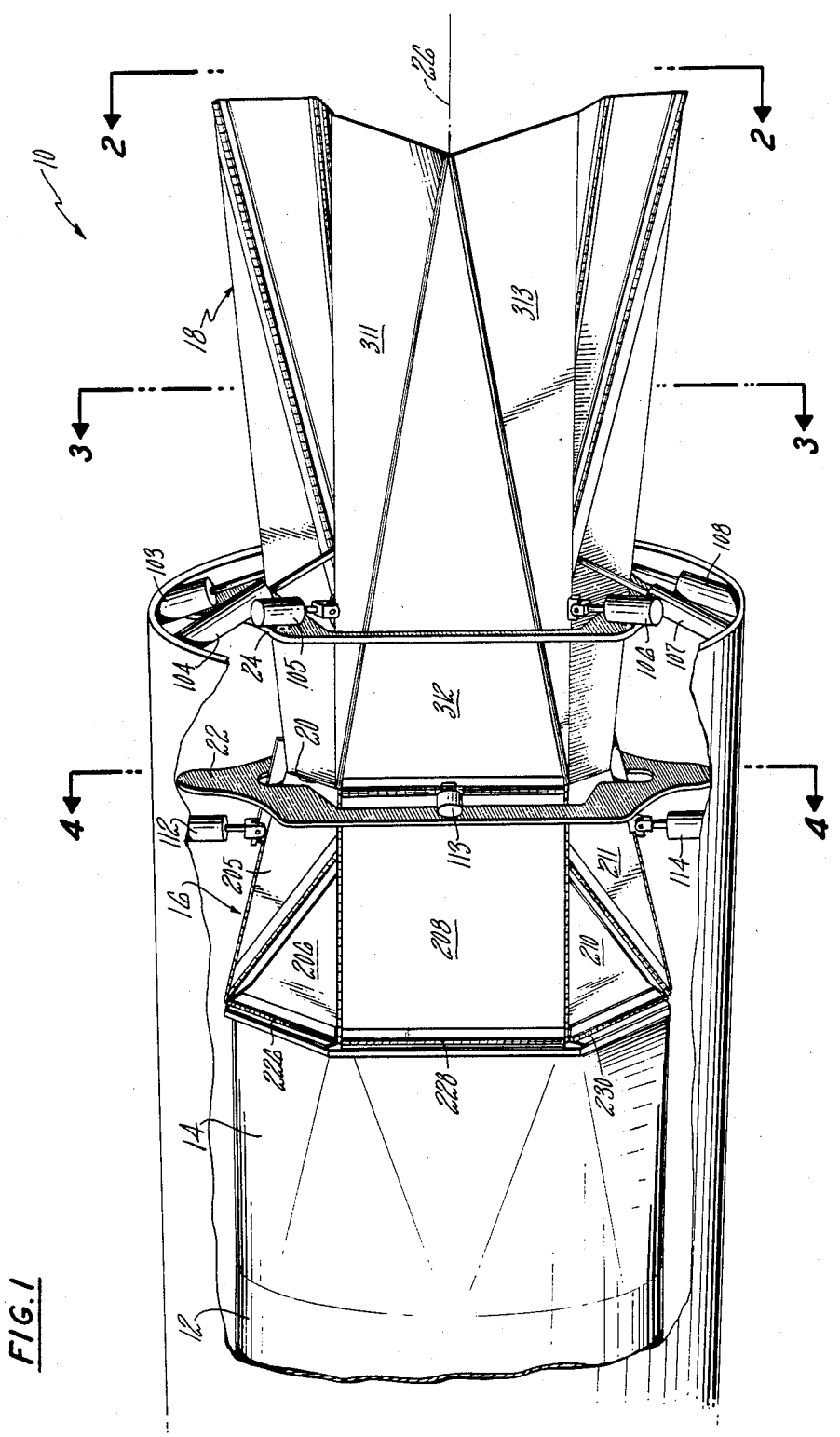
FIG. 1 is a side elevation of a convergent-divergent three axis thrust vectoring exhaust nozzle according to the present invention.

Referring to the drawing figures, and in particular to FIG. 1 thereof, the nozzle 10 according to the present invention is seen in a side elevation. Engine exhaust gas (not shown) flowing aftward in a cylindrical afterburner duct 12 enters a transition section 14 wherein the flow cross section is changed from cylindrical to hexagonal.

The exhaust nozzle 10 includes a convergent section 16 and a divergent section 18, with a restricted throat 20 located therebetween. A first circumferential static frame 22 and a second circumferential static frame 24 are shown disposed respectively about the nozzle throat 20 and midway along the divergent section 18 as shown. A central axis 26 represents the unvectored thrust direction and is generally coincident with the center axis of the cylindrical afterburner duct 12.

The nozzle 10 as shown in FIG. 1 is configured as to deliver full thrust during full afterburning operation of the gas turbine engine (not shown). The throat section 20 is opened to the widest flow area and the divergent duct 18 defines a gas tight conduit for directing the exhaust gases rearwardly generally coincident with the central axis 26. The details and individual components of the convergent and divergent sections 16, 18 will be explained in detail hereinbelow.

Figure 2:
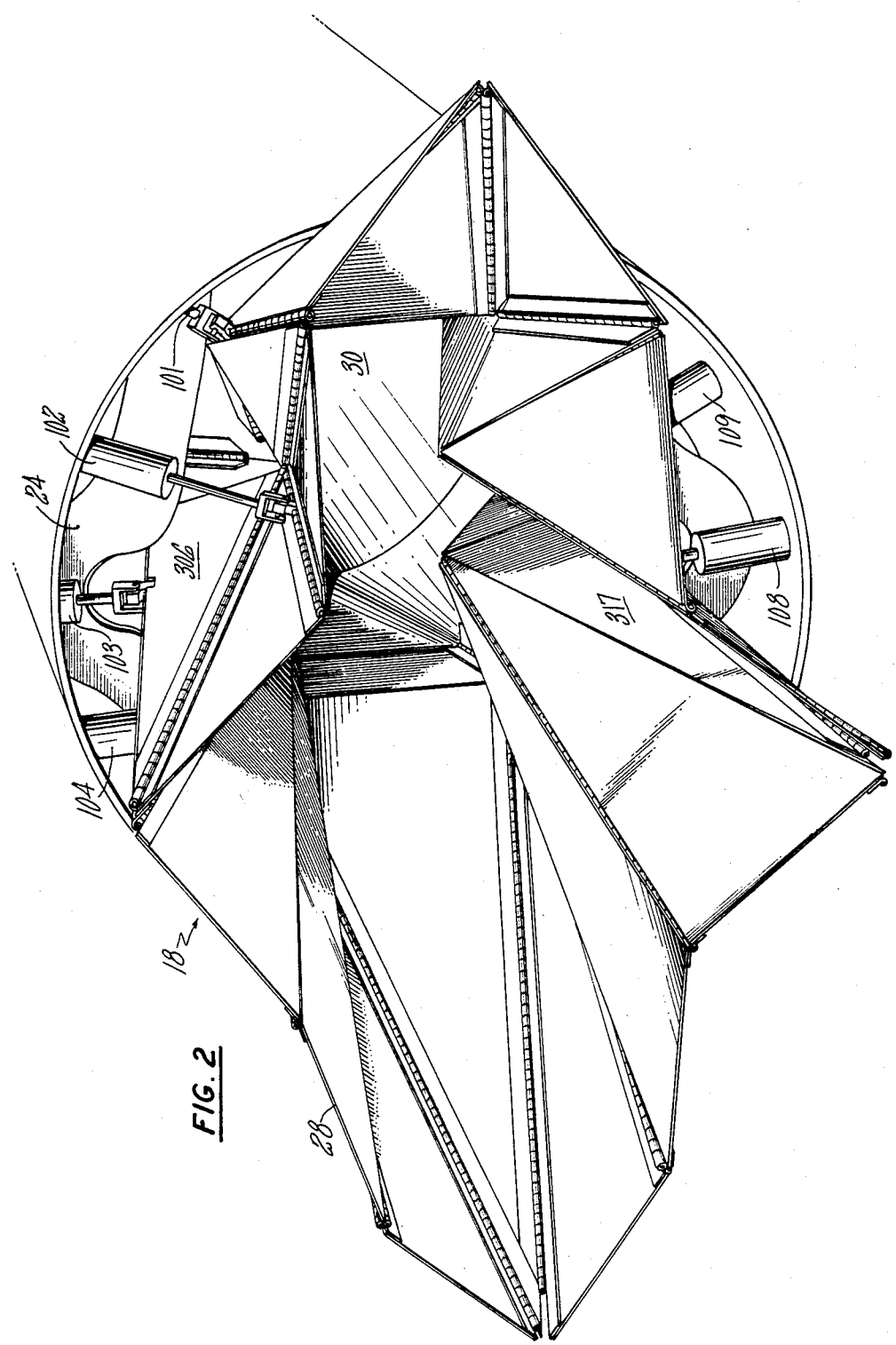
FIG. 2 is a perspective view looking forward or upstream as indicated in FIG. 1. The nozzle is in the full flow configuration for providing unvectored, afterburning thrust.

FIG. 2 shows a perspective view of the nozzle according to the present invention looking generally forwardly from a point aftward of the nozzle outlet 28. The nozzle in FIG. 2 is shown configured for full flow, afterburning operation in which the nozzle throat 20 is positioned to define a maximum area, and wherein the nozzle outlet 28 is fully opened as shown. The interior 30 of the transition section 14 may be viewed through the outlet opening 28.

FIG. 2 also shows the second static frame 24 surrounding the divergent section 18, as well as a plurality of linear actuators 101-110. The actuators 101-110 are positioned between the static frame 24 and the hinged divergent flap segments for selectively positioning the segments as discussed below.

It should be noted that the divergent duct 18 defined by the divergent segments moves independently from the convergent section 16 defined by the convergent flaps, with each section 16, 18 moving to accommodate its particular function in providing an efficient thrust vectoring nozzle.

Figure 4:
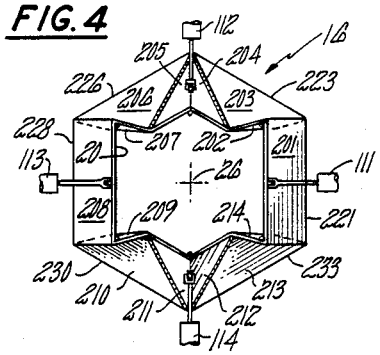
FIG. 4 is a sectional view taken at the throat of the nozzle according to the present invention between the convergent and divergent sections. The throat is shown in a partial thrust configuration.

The operation of the convergent section 16 is best appreciated by reviewing the forward looking cross section taken in the nozzle throat plane as shown in FIG. 4. The convergent section is defined by a plurality of triangular and rectangular flaps 201-214 disposed adjacent each other circumferentially about the gas flow path. Rectangular flaps 201, 208 are located on opposite lateral sides of the centerline 26 and are hingedly secured 221, 218 at opposite sides of the hexagonal transition duct opening.

The remainder of the convergent section 16 consists of triangular flaps 202-207 and 209-214 which are disposed on vertically opposite sides of the central axis 26 and hingedly secured for forming a gas tight convergent duct 16 as shown. Of the triangular flaps 202-207 and 209-214, flaps 203, 206, 210 and 213 are isosceles shaped, while 202, 204, 205, 207, 209, 211, 212, and 214 are right triangular shaped. Isosceles segments 203, 206, 210 and 213 are oriented with the base side forward and hingedly secured to one side of the hexagonal shaped outlet opening of the transition duct 14 while the remaining right triangular shaped flaps, each including a hypotenuse, a long leg, and a short leg, are hingedly secured together such that the hypotenuse of each is hingedly joined to one equal length leg of the adjacent isosceles shaped flap, with the short leg of each segment defining the convergent nozzle throat 20 and the long leg of each being secured either to the adjacent rectangular flap or the adjacent right triangular flap, as shown.

The collected convergent flaps 201-214 are positioned by four linear actuators 111-114 disposed between the first static frame 22 (not shown in FIG. 4) and the downstream edge of the first and eighth rectangular convergent flaps 201, 208 and the downstream end of the hingedly joined right triangular flaps 204, 205 and 211, 212. The four linear actuators 111-114 secured as shown and described above, operate in unison to vary the area of the nozzle throat 20 by moving the flaps 201-214 collectively inward and outward with respect to the central axis 26.

The convergent section 16 of the nozzle according to the present invention moves in response to the current engine power level, afterburner heat output, exhaust gas flow, and other parameters to provide a properly sized throat 20 for efficient engine thrust operation. The scheduling of nozzle outlet area to engine power output is well known and will therefore not be discussed further herein.

Figure 3:
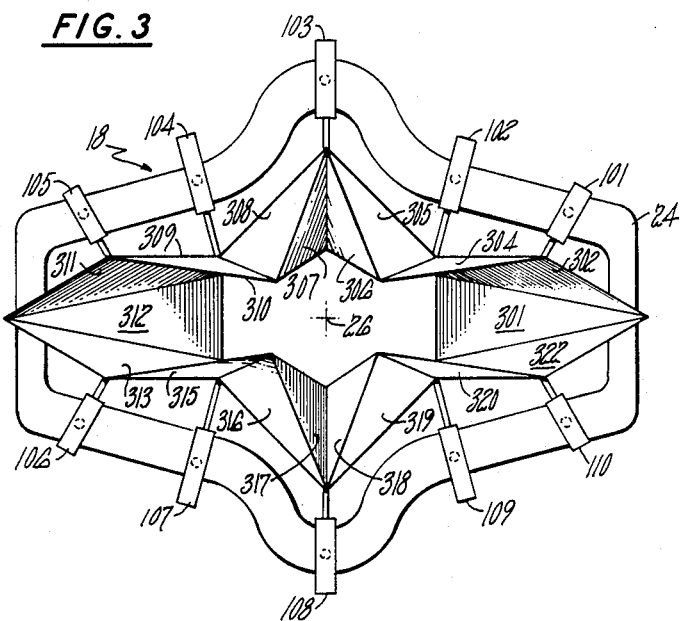
FIG. 3 is a sectional view as indicated in FIG. 1 taken through the divergent section showing the orientation of the flaps. The nozzle is positioned for full, unvectored thrust.

FIG. 3 shows a cross section of the divergent section 18 of the nozzle 10 according to the present invention looking forwardly as indicated in FIG. 1. The divergent duct 18 comprises 22 triangular shaped flap segments 301-322 hingedly secured and distributed circumferentially so as to define the divergent duct 18 as shown. The divergent triangular segments comprise two isosceles shaped triangular segments 301, 312 hingedly secured at the base thereof to the downstream edge of corresponding rectangular convergent flaps 201, 208. The remaining right triangular shaped segments are disposed adjacently about the circumference of the gas flow path with each segment having a hypotenuse and a long leg extending generally in the direction of the gas stream and secured to a corresponding hypotenuse or long leg of the next adjacent right triangular segment. The short legs of the right triangular segments located at the entrance or upstream end of the divergent section 18 are coincident with the short legs of the right triangular convergent flaps and include sliding, gas tight seals disposed therebetween.

Thus, the eight right triangular convergent flaps 202, 204, 205, 207, 209, 211, 212, and 214 each include a downstream short leg side which lies axially adjacent the short leg side of respective divergent right triangular segments 303, 306, 307, 310, 314, 317, 318, and 321. The sliding seals (not shown) disposed between the right triangular convergent flaps and divergent segments need only accommodate axial displacement as the flaps and segments are positioned and may therefore include simple tongue and groove or bellows type seals.

Figure 5:
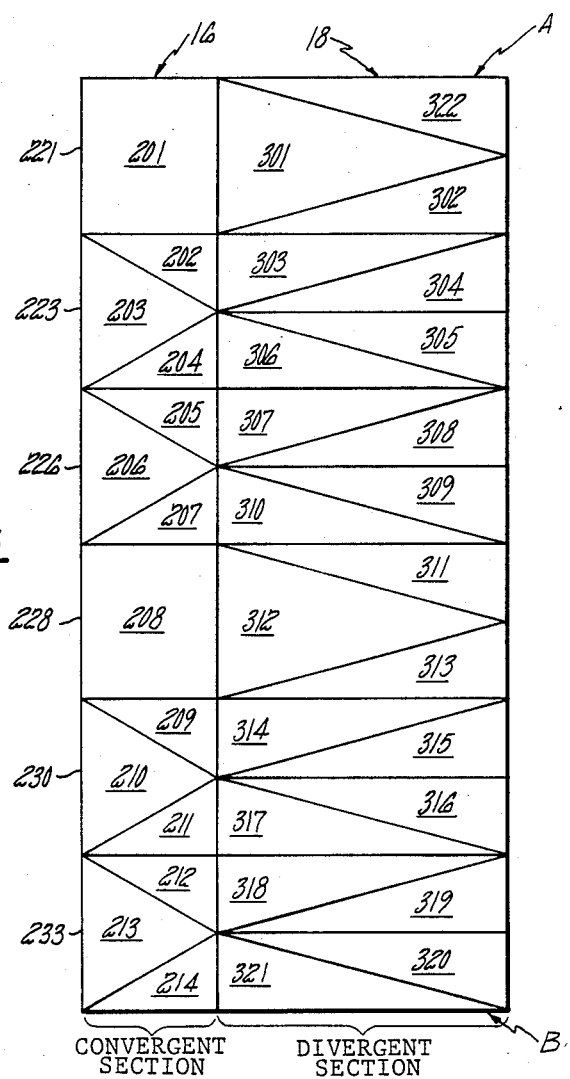
FIG. 5 shows the geometrically developed divergent flaps and convergent segments laid out in a plane.

FIG. 5 shows the convergent and divergent duct sections 16, 18 of the nozzle according to the present invention separated along the circumference and laid out flat for the purpose of illustrating the relative placement and shape of the individual elements. The nozzle according to the preferred embodiment of the present invention may be visualized in three dimensions by matching ends A and B of FIG. 5 together so as to define convergent and divergent ducts 16, 18 about the gas stream as shown generally in FIG. 1.

With regard to the divergent section 18, FIG. 3 shows an upstream facing cross section taken as indicated in FIG. 1 and perpendicular to the central axis 26. Divergent flap sections 301-322 are indicated as visible.

Also shown is the second static frame 24 circumferentially disposed about the divergent duct 18 and having linear actuators 101-110 secured thereto. In the preferred embodiment of the present invention, each divergent actuator 101-110 is operatively connected to the divergent duct 18 at a corresponding hinge joint disposed along the long leg of two adjacent right triangular segments. Hence, divergent actuators 101-110 are disposed at the hinge lines between respective segment pairs 302 and 303, 304 and 305, 306 and 307, 308 and 309, 310 and 311, 313 and 314, 315 and 316, 317 and 318, 319 and 320, 321 and 322.

The nozzle according to the present invention defines a gas directing divergent duct 18 responsive to the position of the divergent segments 301-322 as selected by the action of divergent actuators 101-110. A variety of configurations in addition to the full flow configuration of FIG. 2 may be selected to achieve thrust vectoring about the yaw, pitch, and roll axes as desired.

Figure 6:
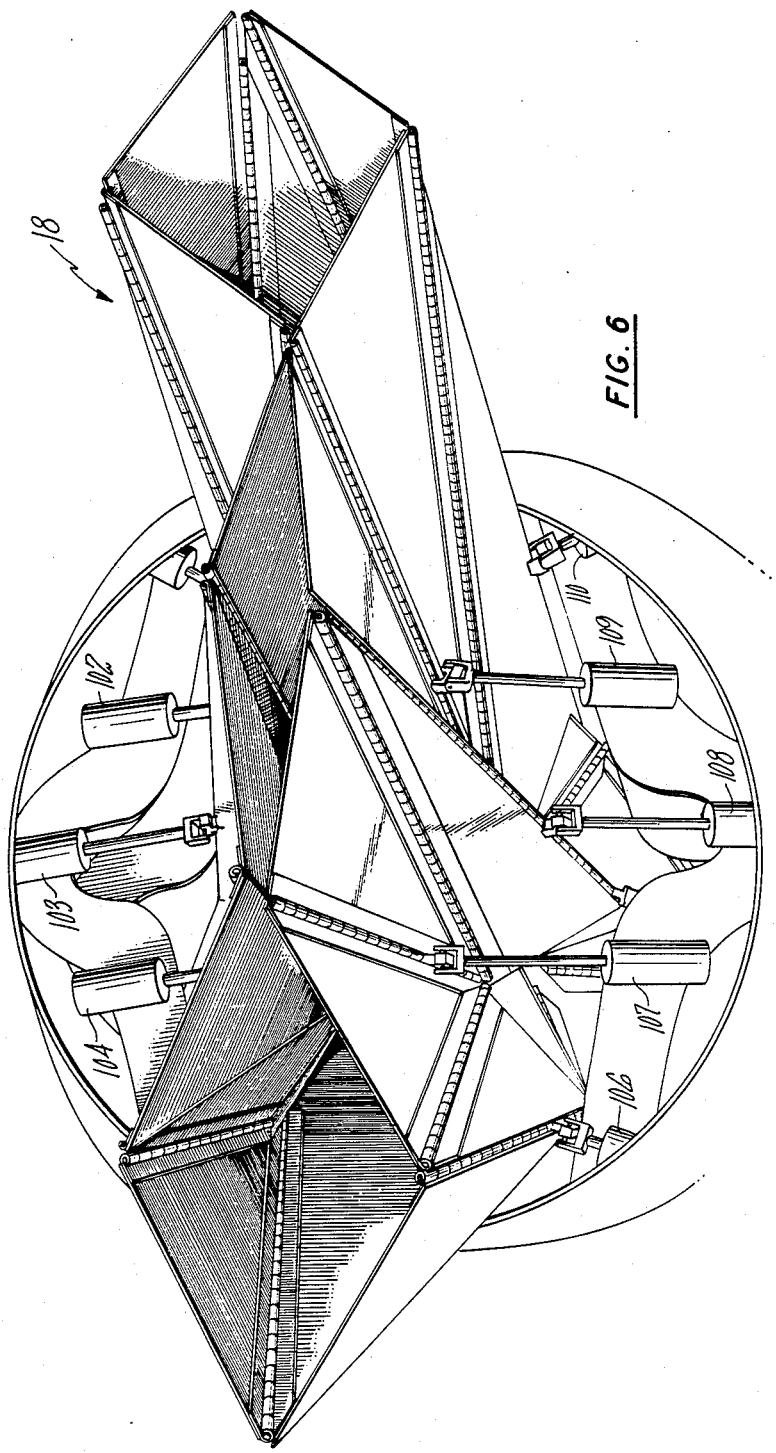
FIG. 6 shows an upstream looking perspective view with the nozzle according to the present invention configured to provide normal, unvectored thrust.

FIG. 6 shows a forward looking view of the divergent section of the nozzle according to the present invention configured so as to deliver normal, unvectored thrust during operation of the gas turbine engine in a non-afterburning mode. The segments of the divergent section 18 have been configured so as to distribute the exhaust gases in a generally lateral plane with the bulk of the gas exiting the nozzle adjacent the isosceles segments 301, 312. Although the preferred configuration for normal thrust as shown in FIG. 6 imparts an opposing lateral velocity vector to the exhaust gases exiting therefrom, it has been determined that such exhaust pattern enhances the stability of the airframe (not shown) especially during takeoff and/or low speed maneuvering. The important feature of the configuration and exhaust flow resulting from the configuration of FIG. 6 is that the thrust and exhaust mass flow is symmetric about both the vertical and lateral planes.

Figure 7:
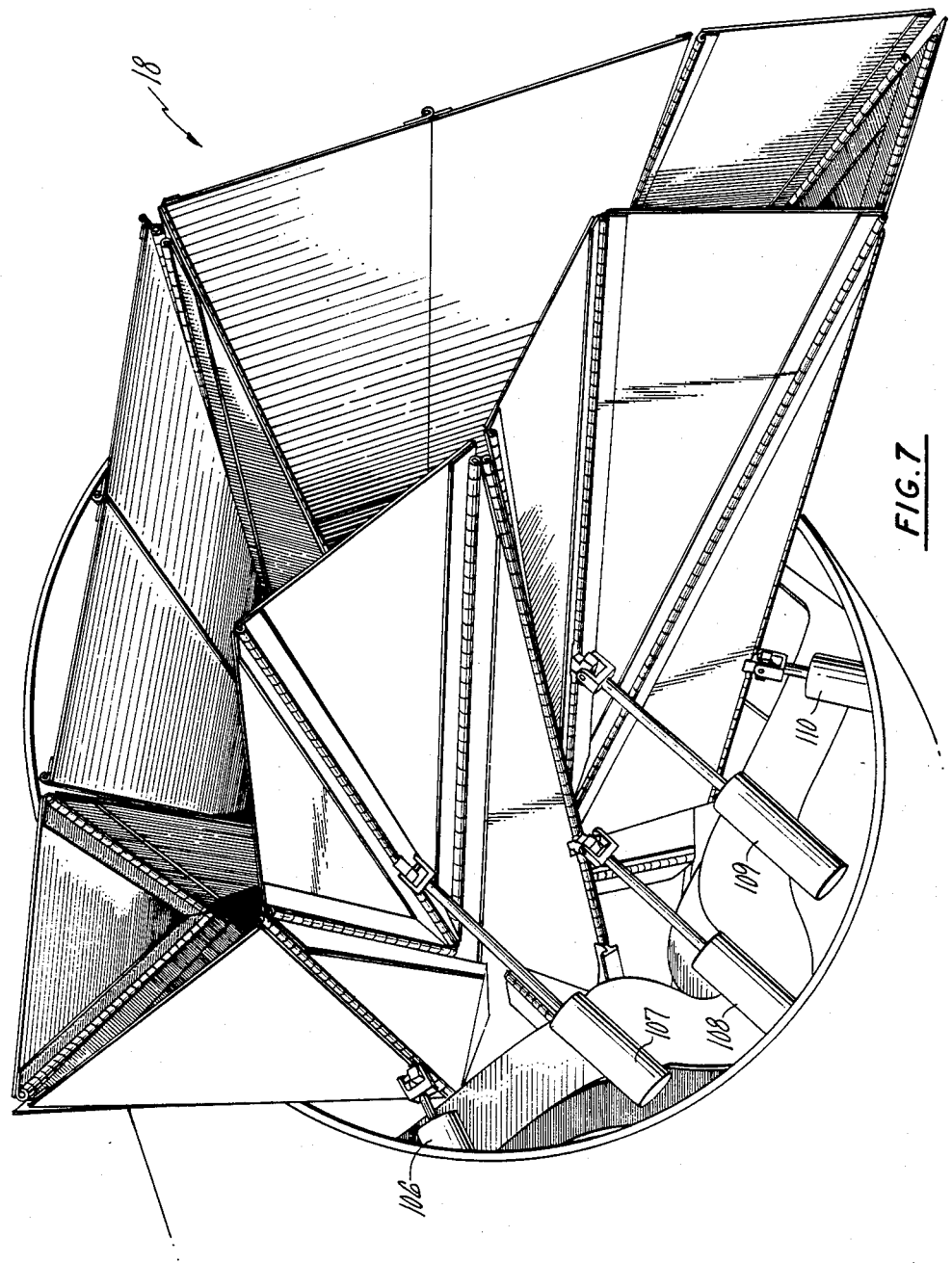
FIG. 7 shows the nozzle configured to provide vectored pitch thrust.

FIG. 7 shows the exhaust nozzle 10 according to the present invention with the divergent section 18 positioned by the actuators 101-110 so as to deliver asymmetric thrust about the pitch axis. As may be clearly seen in FIG. 7, the divergent flap segments 301-322 are oriented so as to divert substantially all of the flow to one side of a horizontal plane passing through the central axis 26, thereby resulting in either an upward or downward pitch moment being imparted to the airframe. Although shown as diverting the axis so as to deliver a downward pitch to the airframe, it will be appreciated that the divergent flap 18 according to the present invention may be similarly positioned so as to deliver a vertically upward pitch moment to the airframe.

Figure 8:
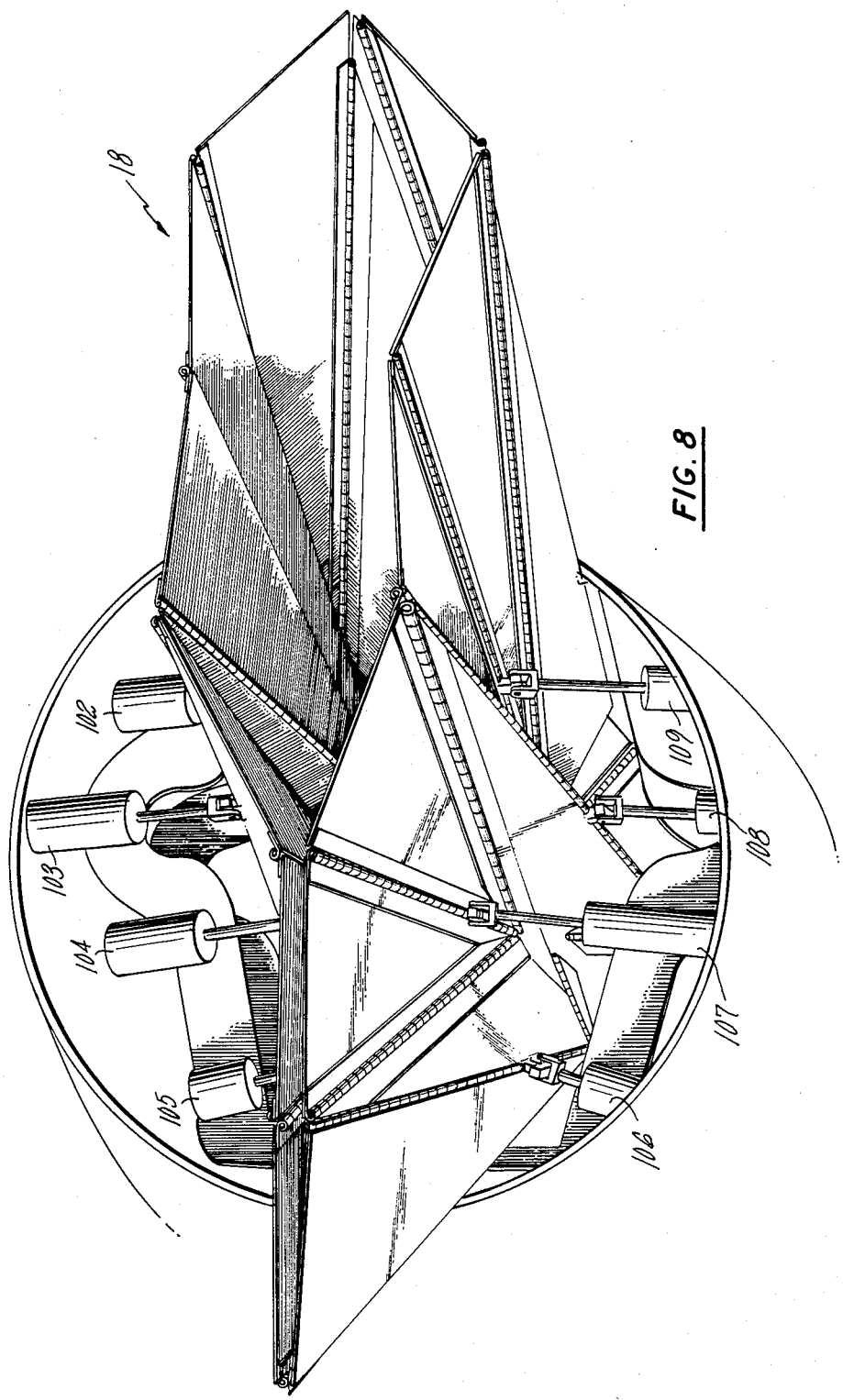
FIG. 8 shows the nozzle according to the present invention configured to provide vectored yaw thrust.

Likewise, FIG. 8 shows the divergent duct 18 according to the present invention configured so as to provide yaw thrust to the airframe. The individual segments 301-322 have been positioned by the divergent actuators 101-110 so as to divert a major portion of the exhaust flow to one side of a vertical plane passing through the nozzle central axis. The asymmetric exhaust flow resulting from the configurations of FIGS. 7 and 8 thus enable the nozzle according to the present invention to provide thrust vectoring about the yaw and pitch axes of the airframe. The thrust vectoring illustrated in FIGS. 7 and 8 can be applied not only during normal thrust operation of the gas turbine engine, but also during full and/or afterburning thrust by similarly diverting the majority of the exhaust gases asymmetrically about the nozzle central axis.

Figure 9:
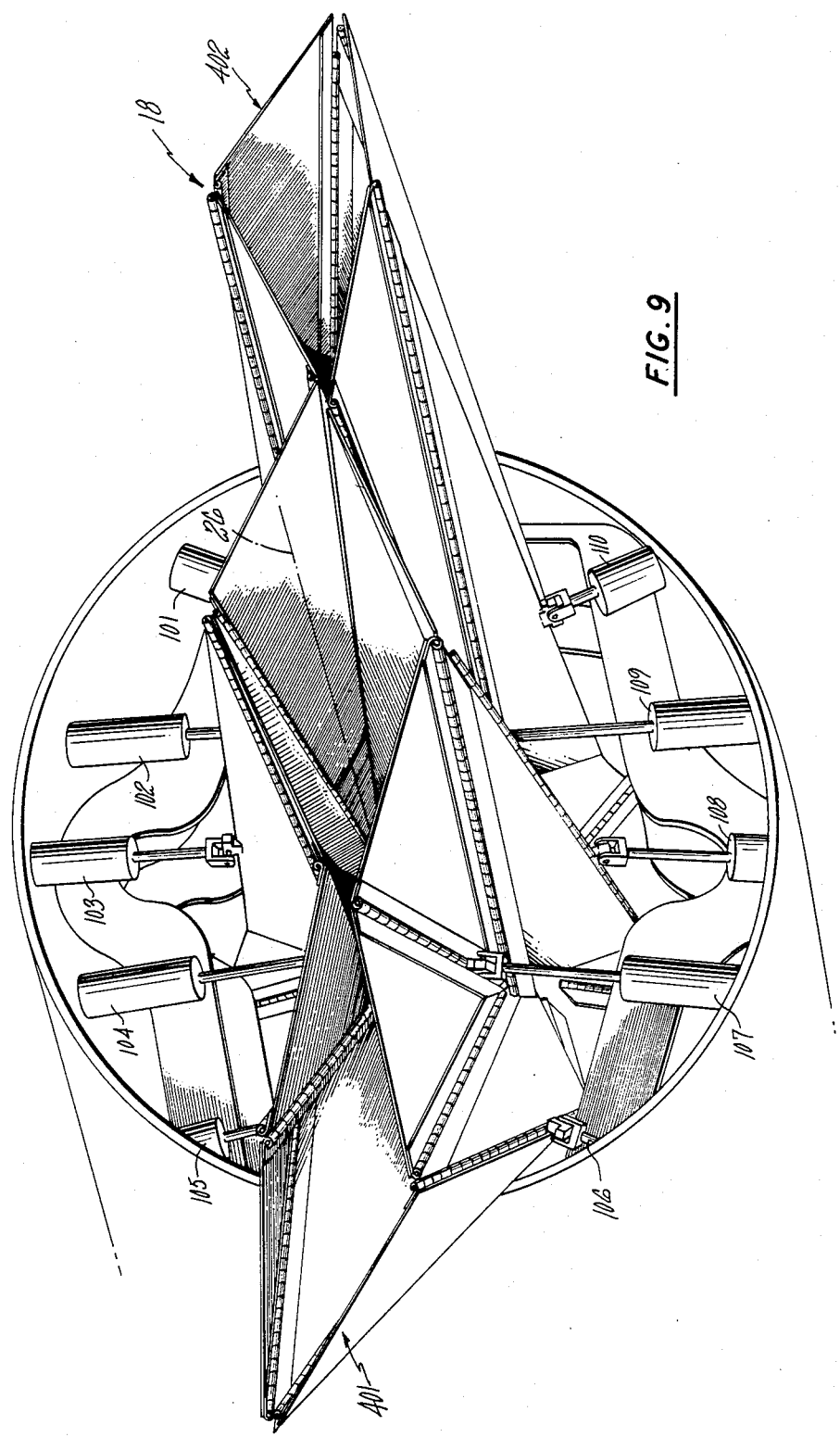
FIG. 9 shows the nozzle according to the present invention configured to provide vectored roll thrust.

Finally, FIG. 9 shows the divergent duct 18 of the nozzle according to the present invention configured so as to impart a roll moment to the associated airframe. The FIG. 9 configuration is somewhat similar to the unvectored, normal thrust configuration of FIG. 6, however it may be appreciated that the laterally outboard portions 401, 401 of the divergent duct adjacent the equilateral triangular segments 301,312 of the duct 18 are configured so as to discharge a greater portion of the exhaust gas flowing therethrough on opposite sides of a horizontal plane passing through the nozzle central axis 26. The result of these two skewed exhaust flows is to develop a counterclockwise moment about the central axis 26 when viewed in the forward looking direction as in FIG. 9. As with the previous vectored thrust configurations, the roll thrust configuration of FIG. 9 may be achieved both in the clockwise direction as well as in combination with the yaw and pitch thrust vectoring configurations at both normal and full thrust.

The nozzle according to the present invention is thus limited only by the sophistication of the actuator control system in developing a gas directing divergent duct configuration to deliver any individual roll, pitch or yaw thrust vector, or any simultaneous combination thereof.

Another feature of the nozzle according to the present invention is the ability to provide a lightweight, structurally rigid flow directing divergent section without excessive bracing or other weight increasing structure. As will be noted by reviewing FIGS. 2 and 6-9, the adjacent triangular segments of the divergent section 18 are disposed at an angle so as to provide a relatively high bending moment at each hinged connection therebetween, thereby achieving a structurally strong yet extremely flexible movable duct. The attachment of the divergent actuators 101-110 at the hinge connections between adjacent triangular segments thus provides the actuating force at the most structurally rigid points of the divergent duct.

Cooling of the convergent and divergent sections 16, 18 may be achieved by a variety of methods well known in the art, including for example routing of cooling air internally via hollow hinges, external impingement, internal cooling air routes within the individual flaps and/or segments, etc. Likewise, cooling air may be allocated among the various segments and flaps as required, depending on the local heat flux, etc.

Another feature of the nozzle design according to the present invention is the ability to accommodate impaired operation of one or more actuators. Again, based upon the sophistication of the actuator control system, a single actuator which becomes frozen or otherwise limited in mobility may not substantially impair the overall operation of the nozzle according to the present invention and the associated aircraft due to the ability of the remaining actuators and movable nozzle components to configure the exhaust gas stream so as to accommodate the impaired components. Thus, a failed actuator which creates an asymmetric exhaust gas flow could be accommodated by configuring the remaining actuators in such a fashion as to develop a symmetric exhaust gas flow thereby permitting normal and safe operation of the aircraft.

The present invention is thus well adapted to provide a three axis thrust vectoring exhaust nozzle for a gas turbine engine powered aircraft or the like. It should further be noted that the nozzle according to the present invention, described herein with reference to the drawing figures which illustrate the preferred embodiment thereof, may be provided in a variety of equivalent embodiments, with the scope thereof being thus limited only by the claims appearing hereinbelow.

I claim:

1. A thrust vectoring exhaust nozzle for a gas turbine engine, comprising:
    a deformable flow duct receiving a flow of engine exhaust gas at an upstream end thereof and discharging said exhaust gas at an open, downstream end thereof,
    wherein the deformable duct includes
    a plurality of generally planar triangular segments, each segment having one side thereof coefficient with one end of the deformable duct and the other two sides thereof extending the full length of the deformable duct, and wherein
    each of the other two sides of each planar triangular segment is hingedly joined the length thereof to one of the other two sides of a next circumferentially adjacent triangular segment, the plurality of hingedly joined triangular segments defining the deformable flow duct;
    a plurality of actuators, each actuator engaged between a static portion of the nozzle exterior to the deformable duct and at least one of the triangular segments, each actuator adapted to selectively position the triangular segment engaged therewith relative to the nozzle static portion for collectively defining one of a plurality of deformable duct configurations for directing the exhaust gases relative to a central nozzle axis.

2. The nozzle as recited in claim 1, further comprising:
    a convergent duct secured at an upstream end to a static transition duct and receiving said flow of exhaust gas therefrom, the convergent duct further defining a downstream, variable area throat end discharging said exhaust gas into the upstream end of the deformable duct, wherein the convergent duct includes,
    a plurality of generally planar flap members, each planar flap member having two sides extending the full length of the convergent duct and hingedly joined over the length thereof to one of the two full length extending sides of a next circumferentially adjacently disposed planar flap member, and wherein
    each planar flap member has a third side disposed coincident with one of the ends of the convergent duct; and
    a second plurality of actuators engaged between at least one of the planar flap members and the static portion of the nozzle, each actuator adapted to selectively position the planar flap member engaged therewith relative to the nozzle static portion, and wherein
    the plurality of positioned planar flap members collectively define the variable area nozzle throat.

3. A yaw, pitch, and roll thrust vectoring exhaust nozzle for a gas turbine engine having a central axis, a forwardly disposed convergent section, and a rearwardly disposed divergent section, a flow of exhaust gases passing generally axially through the convergent section and into the divergent section, wherein the convergent section comprises a plurality of generally planar flap segments arranged adjacently and circumferentially to define a first movable convergent duct, the plurality of planar flap segments comprising, in circumferential sequence,
    a first rectangular shaped flap having a forward edge and a rearward edge, each forward and rearward edge lying in a corresponding radial plane defined with respect to the nozzle central axis, and first and second lateral edges, the first and second lateral edges each lying in a corresponding axial plane defined with respect to the nozzle central axis,
    a first right triangular shaped convergent flap, the long leg thereof hingedly secured to the first lateral edge of the first rectangularly shaped convergent flap and the short leg thereof disposed axially rearwardly,
    a third, isosceles triangular shaped convergent flap, the first leg thereof hingedly secured to the hypotenuse of the second right convergent flap and the base thereof disposed forwardly,
    a fourth, right triangular shaped convergent flap, the hypotenuse thereof hingedly secured to the second leg of the third isosceles convergent flap and the short leg thereof disposed rearwardly,
    a fifth, right triangular shaped convergent flap, the long leg thereof hingedly secured to the long leg of the fourth right shaped convergent flap and the base thereof disposed rearwardly,
    a sixth, isosceles triangular shaped convergent flap, the first leg thereof hingedly secured to the long leg of the fifth right convergent flap and the base thereof disposed forwardly,
    a seventh right triangular shaped convergent flap, the hypotenuse thereof hingedly secured to the second leg of the sixth isosceles convergent flap, and the short leg thereof disposed rearwardly,
    an eighth, rectangular shaped convergent flap having a forward edge and a rearward edge, each forward edge and rearward edge lying in a corresponding radial plane defined with respect to the nozzle central axis, and first and second lateral edges, each lying in a corresponding axial plane defined with respect to the nozzle central axis, the first lateral edge thereof hingedly secured to the long leg of the seventh right convergent flap,
    a ninth, right triangular shaped convergent flap, the long leg thereof hingedly secured to the second lateral edge of the eighth rectangular convergent flap and the short leg thereof disposed rearwardly, a tenth, isosceles triangular shaped convergent flap, the first leg thereof hingedly secured to the hypotenuse of the ninth right convergent flap and the base thereof disposed forwardly, an eleventh, right triangular shaped convergent flap, the hypotenuse thereof hingedly secured to the second leg of the tenth isosceles convergent flap and the short leg thereof disposed rearwardly, a twelfth, right triangular shaped convergent flap, the long leg thereof hingedly secured to the long leg of the eleventh right convergent flap and the short leg thereof disposed rearwardly, a thirteenth, isosceles triangular shaped convergent flap, the first leg thereof hingedly secured to the long leg of the twelfth right convergent flap and the base thereof disposed forwardly, a fourteenth, right triangular shaped convergent flap, the hypotenuse thereof hingedly secured to the second leg of the thirteenth isosceles convergent flap, and the short leg thereof disposed rearwardly and the long leg thereof hingedly secured to the second lateral edge of the first rectangular convergent flap, and wherein the forward edges of the first rectangular convergent flap and the eighth rectangular convergent flap are hingedly secured to a static frame, and the bases of the third, sixth, tenth, and thirteenth isosceles convergent flaps further comprise corresponding gas tight seals, disposed between each base and the static structure for sealing against any flow of exhaust gas therebetween;

and wherein the divergent section comprises a plurality of generally planar triangular segments, each segment extending the full axial length of the divergent section, arranged adjacently and circumferentially to define a second movable duct receiving the flow of exhaust gas from the first movable convergent duct, the plurality of divergent planar triangular segments comprising, in sequence, a first, isosceles triangular shaped segment, the base thereof disposed forwardly and hingedly secured to the rearward edge of the first rectangular convergent flap, a second, right triangular shaped segment, the hypotenuse thereof hingedly secured to the first leg of the first isosceles triangular segment and the short leg thereof disposed rearwardly, a third, right triangular shaped segment, the long leg thereof hingedly secured to the long leg of the second right triangular segment and the short leg thereof disposed forwardly, a fourth, right triangular shaped segment, the hypotenuse thereof hingedly secured to the hypotenuse of the third right triangular segment and the short leg thereof disposed rearwardly, a fifth, right triangular shaped segment, the long leg thereof hingedly secured to the long leg of the fourth right triangular segment and the short leg thereof disposed rearwardly, a sixth, right triangular shaped segment, the hypotenuse thereof hingedly secured to the hypotenuse of the fifth right triangular segment and the short leg thereof disposed forwardly, a seventh, right triangular shaped segment, the long leg thereof hingedly secured to the long leg of the sixth right triangular segment, and the short leg thereof disposed forwardly, an eighth, right triangular shaped segment, the hypotenuse thereof hingedly secured to the hypotenuse of the seventh right triangular segment and the short leg thereof disposed rearwardly, a ninth, right triangular shaped segment, the long leg thereof hingedly secured to the long leg of the eighth right triangular segment and the short leg thereof disposed rearwardly, a tenth, right triangular shaped segment, the hypotenuse thereof hingedly secured to the hypotenuse of the ninth right triangular segment and the short leg thereof disposed forwardly, an eleventh, right triangular shaped segment, the long leg thereof hingedly secured to the long leg of the tenth right triangular segment and the short leg thereof disposed rearwardly, a twelfth, isosceles triangular shaped segment, the first leg thereof hingedly secured to the hypotenuse of the eleventh right triangular segment and the base thereof disposed forwardly, and hingedly secured to the rearward edge of the eighth rectangular convergent flap, a thirteenth, right triangular shaped segment, the hypotenuse thereof hingedly secured to the second leg of the twelfth isosceles triangular segment and the short leg thereof disposed rearwardly, a fourteenth, right triangular shaped segment, the long leg thereof hingedly secured to the long leg of the thirteenth right triangular segment and the short leg thereof disposed forwardly, a fifteenth, right triangular shaped segment, the hypotenuse thereof hingedly secured to the hypotenuse of the fourteenth right triangular segment and the short leg thereof disposed rearwardly, a sixteenth, right triangular shaped segment, the long leg thereof hingedly secured to the long leg of the fifteenth right triangular segment and the short leg thereof disposed rearwardly, a seventeenth, right triangular shaped segment, the hypotenuse thereof hingedly secured to the hypotenuse of the sixteenth right triangular segment and the short leg thereof disposed forwardly, an eighteenth, right triangular shaped segment, the long leg thereof hingedly secured to the long leg of the seventeenth right triangular segment, a nineteenth, right triangular shaped segment, the hypotenuse thereof hingedly secured to the hypotenuse of the eighteenth right triangular segment and the short leg thereof disposed rearwardly, a twentieth, right triangular shaped segment, the long leg thereof hingedly secured to the long leg of the nineteenth right triangular segment and the short leg thereof disposed rearwardly, a twenty-first, right triangular shaped segment, the hypotenuse thereof hingedly secured to the hypotenuse of the twentieth right triangular segment and the short leg thereof disposed forwardly, a twenty-second, right triangular shaped segment, the long leg thereof hingedly secured to the long leg of the twenty-first right triangular segment, the short leg thereof disposed rearwardly and the hypotenuse thereof hingedly secured to the second leg of the first isosceles triangular segment;

and a plurality of seals, located between the downstream disposed short legs of the second, fourth, fifth, seventh, ninth, eleventh, twelfth, and fourteenth right triangular convergent flaps and the corresponding forwardly disposed short legs of the third, sixth, seventh, tenth, fourteenth, seventeenth, eighteenth, and twenty-first divergent right triangular segments, for preventing the flow of exhaust gases therebetween.

4. The nozzle as recited in claim 3, further comprising:

first and second actuator frames, the first frame disposed circumferentially about the convergent section and the second frame disposed circumferentially about the divergent section, further comprising first, second, third, and fourth linear convergent actuators, the first convergent actuator disposed between the first frame and the first rectangular flap rearward edge, the second convergent actuator disposed between the convergent frame and the rearward end of the long leg hinge disposed between the fourth and fifth convergent flaps, the third convergent actuator disposed between the convergent frame and the rearward edge of the eighth rectangular convergent flap, and the fourth convergent actuator disposed between the convergent frame and the rearward end of the long leg hinge disposed between the eleventh and twelfth convergent flaps; and first, second, third, fourth, fifth, sixth, seventh, eighth, ninth, and tenth linear divergent actuators located axially intermediate the upstream and downstream ends of the divergent section, and wherein the first divergent actuator is disposed between the divergent frame and the long leg hinge between the second and third right triangular segments, the second divergent actuator is disposed between the divergent frame and the long leg hinge between the fourth and fifth right triangular segments, the third divergent actuator is disposed between the divergent frame and the long leg hinge between the sixth and seventh right triangular segments, the fourth divergent actuator is disposed between the divergent frame and the long leg hinge between the eighth and ninth right triangular segments, the fifth divergent actuator is disposed between the divergent frame and the long leg hinge between the tenth and eleventh right triangular segments, the sixth divergent actuator is disposed between the divergent frame and the long leg hinge between the thirteenth and fourteenth right triangular segments, the seventh divergent actuator is disposed between the divergent frame and the long leg hinge between the fifteenth and sixteenth right triangular flap segments, the eighth divergent actuator is disposed between the divergent frame and the long leg hinge between the seventeenth and eighteenth right triangular segments, the ninth divergent actuator is disposed between the divergent frame and the long leg hinge between the nineteenth and twentieth right triangular segments, the tenth divergent actuator is disposed between the divergent frame and the long leg hinge between the twenty-first and twenty-second right triangular segments.

5. A yaw, pitch, and roll thrust vectoring exhaust nozzle for a gas turbine engine having a central axis, a rearwardly disposed divergent section, and a flow of exhaust gases passing generally axially into the divergent section, wherein the divergent section comprises:

a plurality of generally planar triangular segments, each segment extending the full axial length of the divergent section, arranged adjacently and circumferentially to define a movable duct receiving the flow of exhaust gas, the plurality of divergent planar triangular segments comprising, in sequence, a first, isosceles triangular shaped segment, the base thereof disposed forwardly, a second, right triangular shaped segment, the hypotenuse thereof hingedly secured to the first leg of the first isosceles triangular segment and the short leg thereof disposed rearwardly, a third, right triangular shaped segment, the long leg thereof hingedly secured to the long leg of the second right triangular segment and the short leg thereof disposed forwardly, a fourth, right triangular shaped segment, the hypotenuse thereof hingedly secured to the hypotenuse of the third right triangular segment and the short leg thereof disposed rearwardly, a fifth, right triangular shaped segment, the long leg thereof hingedly secured to the long leg of the fourth right triangular segment and the short leg thereof disposed rearwardly, a sixth, right triangular shaped segment, the hypotenuse thereof hingedly secured to the hypotenuse of the fifth right triangular segment and the short leg thereof disposed forwardly, a seventh, right triangular shaped segment, the long leg thereof hingedly secured to the long leg of the sixth right triangular segment, and the short leg thereof disposed forwardly, an eighth, right triangular shaped segment, the hypotenuse thereof hingedly secured to the hypotenuse of the seventh right triangular segment and the short leg thereof disposed rearwardly, a ninth, right triangular shaped segment, the long leg thereof hingedly secured to the long leg of the eighth right triangular segment and the short leg thereof disposed rearwardly, a tenth, right triangular shaped segment, the hypotenuse thereof hingedly secured to the hypotenuse of the ninth right triangular segment and the short leg thereof disposed forwardly, an eleventh, right triangular shaped segment, the long leg thereof hingedly secured to the long leg of the tenth right triangular segment and the short leg thereof disposed rearwardly, a twelfth, isosceles triangular shaped segment, the first leg thereof hingedly secured to the hypotenuse of the eleventh right triangular segment and the base thereof disposed forwardly, a thirteenth, right triangular shaped segment, the hypotenuse thereof hingedly secured to the second leg of the twelfth isosceles triangular segment and the short leg thereof disposed rearwardly, a fourteenth, right triangular shaped segment, the long leg thereof hingedly secured to the long leg of the thirteenth right triangular segment and the short leg thereof disposed forwardly, a fifteenth, right triangular shaped segment, the hypotenuse thereof hingedly secured to the hypotenuse of the fourteenth right triangular segment and the short leg thereof disposed rearwardly, a sixteenth, right triangular shaped segment, the long leg thereof hingedly secured to the long leg of the fifteenth right triangular segment and the short leg thereof disposed rearwardly, a seventeenth, right triangular shaped segment, the hypotenuse thereof hingedly secured to the hypotenuse of the sixteenth right triangular segment and the short leg thereof disposed forwardly, an eighteenth, right triangular shaped segment, the long leg thereof hingedly secured to the long leg of the seventeenth right triangular segment, a nineteenth, right triangular shaped segment, the hypotenuse thereof hingedly secured to the hypotenuse of the eighteenth right triangular segment and the short leg thereof disposed rearwardly, a twentieth, right triangular shaped segment, the long leg thereof hingedly secured to the long leg of the nineteenth right triangular segment and the short leg thereof disposed rearwardly, a twenty-first, right triangular shaped segment, the hypotenuse thereof hingedly secured to the hypotenuse of the twentieth right triangular segment and the short leg thereof disposed forwardly, and a twenty-second, right triangular shaped segment, the long leg thereof hingedly secured to the long leg of the twenty-first right triangular segment, the short leg thereof disposed rearwardly and the hypotenuse thereof hingedly secured to the second leg of the first isosceles triangular segment.

6. The nozzle as recited in claim 5, further comprising:

an actuator frame, disposed circumferentially about the divergent section, and first, second, third, fourth, fifth, sixth, seventh, eighth, ninth, and tenth linear divergent actuators located axially intermediate the upstream and downstream ends of the divergent section, wherein the first divergent actuator is disposed between the divergent frame and the long leg hinge between the second and third right triangular segments, the second divergent actuator is disposed between the divergent frame and the long leg hinge between the fourth and fifth right triangular segments, the third divergent actuator is disposed between the divergent frame and the long leg hinge between the sixth and seventh right triangular segments, the fourth divergent actuator is disposed between the divergent frame and the long leg hinge between the eighth and ninth right triangular segments, the fifth divergent actuator is disposed between the divergent frame and the long leg hinge between the tenth and eleventh right triangular segments, the sixth divergent actuator is disposed between the divergent frame and the long leg hinge between the thirteenth and fourteenth right triangular segments, the seventh divergent actuator is disposed between the divergent frame and the long leg hinge between the fifteenth and sixteenth right triangular flap segments, the eighth divergent actuator is disposed between the divergent frame and the long leg hinge between the seventeenth and eighteenth right triangular segments, the ninth divergent actuator is disposed between the divergent frame and the long leg hinge between the nineteenth and twentieth right triangular segments, the tenth divergent actuator is disposed between the divergent frame and the long leg hinge between the twenty-first and twenty-second right triangular segments.

7. A yaw, pitch, and roll thrust vectoring exhaust nozzle for a gas turbine engine having a central axis, a forwardly disposed convergent section, a flow of exhaust gases passing generally axially through the convergent section, wherein the convergent section comprises, a plurality of generally planar flap segments arranged adjacently and circumferentially to define a first movable convergent duct, the plurality of planar flap segments comprising, in circumferential sequence, a first rectangular shaped flap having a forward edge and a rearward edge, each forward and rearward edge lying in a corresponding radial plane defined with respect to the nozzle central axis, and first and second lateral edges, the first and second lateral edges each lying in a corresponding axial plane defined with respect to the nozzle central axis, a first right triangular shaped convergent flap, the long leg thereof hingedly secured to the first lateral edge of the first rectangularly shaped convergent flap and the short leg thereof disposed axially rearwardly, a third, isosceles triangular shaped convergent flap, the first leg thereof hingedly secured to the hypotenuse of the second right convergent flap and the base thereof disposed forwardly, a fourth, right triangular shaped convergent flap, the hypotenuse thereof hingedly secured to the second leg of the third isosceles convergent flap and the short leg thereof disposed rearwardly, a fifth, right triangular shaped convergent flap, the long leg thereof hingedly secured to the long leg of the fourth right shaped convergent flap and the base thereof disposed rearwardly, a sixth, isosceles triangular shaped convergent flap, the first leg thereof hingedly secured to the long leg of the fifth right convergent flap and the base thereof disposed forwardly, a seventh right triangular shaped convergent flap, the hypotenuse thereof hingedly secured to the second leg of the sixth isosceles convergent flap, and the short leg thereof disposed rearwardly, an eighth, rectangular shaped convergent flap having a forward edge and a rearward edge, each forward edge and rearward edge lying in a corresponding radial plane defined with respect to the nozzle central axis, and first and second lateral edges, the first lateral edge thereof hingedly secured to the long leg of the seventh right convergent flap, a ninth, right triangular shaped convergent flap, the long leg thereof hingedly secured to the second lateral edge of the eighth rectangular convergent flap and the short leg thereof disposed rearwardly, a tenth, isosceles triangular shaped convergent flap, the first leg thereof hingedly secured to the hypotenuse of the ninth right convergent flap and the base thereof disposed forwardly, an eleventh, right triangular shaped convergent flap, the hypotenuse thereof hingedly secured to the second leg of the tenth isosceles convergent flap and the short leg thereof disposed rearwardly, a twelfth, right triangular shaped convergent flap, the long leg thereof hingedly secured to the long leg of the eleventh right convergent flap and the short leg thereof disposed rearwardly, a thirteenth, isosceles triangular shaped convergent flap, the first leg thereof hingedly secured to the long leg of the twelfth right convergent flap and the base thereof disposed forwardly, a fourteenth, right triangular shaped convergent flap, the hypotenuse thereof hingedly secured to the second leg of the thirteenth isosceles convergent flap, and the short leg thereof disposed rearwardly and the long leg thereof hingedly secured to the second lateral edge of the first rectangular convergent flap, and wherein the forward edges of the first rectangular convergent flap and the eighth rectangular convergent flap are hingedly secured to a static frame, and the bases of the third, sixth, tenth, and thirteenth isosceles convergent flaps further comprise corresponding gas tight seals, disposed between each base and the static structure for sealing against any flow of exhaust gas therebetween.

8. The nozzle as recited in claim 7, further comprising:

an actuator frame disposed circumferentially about the convergent section and first, second, third, and fourth linear convergent actuators, the first convergent actuator disposed between the first frame and the first rectangular flap rearward edge, the second convergent actuator disposed between the convergent frame and the rearward end of the long leg hinge disposed between the fourth and fifth convergent flaps, the third convergent actuator disposed between the convergent frame and the rearward edge of the eighth rectangular convergent flap, and the fourth convergent actuator disposed between the convergent frame and the rearward end of the long leg hinge disposed between the eleventh and twelfth convergent flaps.

* * * * *